US009418545B2

(12) United States Patent
Petrie et al.

(10) Patent No.: US 9,418,545 B2
(45) Date of Patent: Aug. 16, 2016

(54) METHOD AND SYSTEM FOR COLLECTING TRAFFIC DATA

(75) Inventors: Alex Petrie, Cheshire (GB); Dominic Jordan, Greater Manchester (GB); Jonathan Burr, Cheshire (GB)

(73) Assignee: INRIX HOLDING LIMITED (GB)

( * ) Notice: Subject to any disclaimer, the term of this patent is extended or adjusted under 35 U.S.C. 154(b) by 36 days.

(21) Appl. No.: 14/118,191

(22) PCT Filed: Jun. 29, 2012

(86) PCT No.: PCT/GB2012/051517

§ 371 (c)(1),
(2), (4) Date: Aug. 21, 2014

(87) PCT Pub. No.: WO2013/001307

PCT Pub. Date: Jan. 3, 2013

(65) Prior Publication Data

US 2014/0365103 A1 Dec. 11, 2014

(30) Foreign Application Priority Data

Jun. 29, 2011 (GB) .................................. 1111093.9

(51) Int. Cl.
*G06F 19/00* (2011.01)
*G08G 1/01* (2006.01)

(52) U.S. Cl.
CPC ................ *G08G 1/01* (2013.01); *G08G 1/0133* (2013.01)

(58) Field of Classification Search
CPC ............................... G08G 1/01; G08G 1/0133
See application file for complete search history.

(56) References Cited

U.S. PATENT DOCUMENTS 4,361,202 A 11/1982 Minovitch
4,985,705 A 1/1991 Stammler
5,122,959 A 6/1992 Nathanson et al.
5,131,020 A 7/1992 Liebesny et al.
5,182,555 A 1/1993 Sumner
5,187,810 A 2/1993 Yoneyama et al.
5,272,638 A 12/1993 Martin et al.
5,327,144 A 7/1994 Stilp et al.
5,343,906 A 9/1994 Tibbals, III
5,428,545 A 6/1995 Maegawa et al.
5,432,842 A 7/1995 Kinoshita et al.
5,438,517 A 8/1995 Sennott et al.
5,465,088 A 11/1995 Braegas
5,465,289 A 11/1995 Kennedy, Jr.
5,523,950 A 6/1996 Peterson
5,539,645 A 7/1996 Mandhyan et al.
5,543,789 A 8/1996 Behr et al.
5,543,802 A 8/1996 Villevieille et al.
5,559,864 A 9/1996 Kennedy, Jr.
5,613,205 A 3/1997 Dufour
5,689,252 A 11/1997 Ayanoglu et al.
5,724,243 A 3/1998 Westerlage et al.
5,732,383 A 3/1998 Foladare et al.
5,740,166 A 4/1998 Ekemark et al.
5,745,865 A 4/1998 Rostoker et al.
5,751,245 A 5/1998 Janky et al.
5,774,827 A 6/1998 Smith, Jr. et al.
5,801,943 A 9/1998 Nasburg
5,839,086 A 11/1998 Hirano
5,845,227 A 12/1998 Peterson
5,880,958 A 3/1999 Helms et al.
5,933,100 A * 8/1999 Golding ............ G01C 21/3492 340/988
5,948,042 A 9/1999 Heimann et al.
5,959,568 A 9/1999 Woolley
6,012,012 A 1/2000 Fleck et al.
6,038,444 A 3/2000 Schipper et al.
6,098,016 A 8/2000 Ishihara
6,128,571 A 10/2000 Ito et al.
6,161,071 A 12/2000 Shuman et al.
6,178,374 B1 1/2001 Mohlenkamp et al.
6,219,793 B1 4/2001 Li et al.
6,230,011 B1 5/2001 Guenther et al.
6,236,932 B1 5/2001 Fastenrath
6,236,933 B1 5/2001 Lang
6,240,364 B1 5/2001 Kerner et al.
6,256,577 B1 7/2001 Graunke
6,263,205 B1 7/2001 Yamaura et al.
6,314,360 B1 11/2001 Becker
6,317,686 B1 11/2001 Ran (Continued)

FOREIGN PATENT DOCUMENTS

AT 507619 A1 6/2010
CA 2434707 A1 3/2004

(Continued)

OTHER PUBLICATIONS

"Basic Statistics Review—Unit 2—203", all pages, date unknown, https://www.msu.edu/user/sw/statrev/strv203.htm.*
"Using the Median Absolute Deviation to Find Outliers", all pages, date unknown, http://eurekastatistics.com/using-the-median-absolute-deviation-to-find-outliers.*
Office Action issued in Chinese Application No. 2012800313518 dated Mar. 4, 2015. (English translation).
Office Action issued in U.S. Appl. No. 11/269,908 dated Jan. 4, 2013.
Office Action issued in U.S. Appl. No. 11/269,908 dated Jun. 22, 2012.
Office Action issued in U.S. Appl. No. 10/999,994 dated Apr. 15, 2010.
Office Action issued in U.S. Appl. No. 10/999,994 dated Sep. 9, 2010.
Office Action issued in U.S. Appl. No. 11/280,833 dated Dec. 3, 2010.

(Continued)

*Primary Examiner* — Calvin Cheung

(74) *Attorney, Agent, or Firm* — Burns & Levinson LLP; Joseph M. Maraia

(57) ABSTRACT

A method of identifying congestion comprising the steps of monitoring traffic conditions using off call tracking data relating to cellular mobile communication devices carried in vehicles along an off call path and determining when an off call path crossing time of the call path exceeds a threshold. When the off call path crossing time exceeds the threshold, obtaining traffic data from probe vehicles on roads corresponding to the off call path, and analyzing the traffic data to determine the location of the congestion along the off call path.

12 Claims, No Drawings

(56) References Cited

U.S. PATENT DOCUMENTS 6,341,255 B1 1/2002 Lapidot
6,401,027 B1 6/2002 Xu et al.
6,401,037 B1 6/2002 Muller et al.
6,411,897 B1 6/2002 Gaspard, II
6,424,838 B1 7/2002 Stobbe et al.
6,430,496 B1 8/2002 Smith et al.
6,438,561 B1 8/2002 Israni et al.
6,466,862 B1 10/2002 DeKock et al.
6,480,783 B1 11/2002 Myr
6,490,519 B1 12/2002 Lapidot et al.
6,532,414 B2 3/2003 Mintz
6,545,637 B1 4/2003 Krull et al.
6,587,781 B2 7/2003 Feldman et al.
6,594,577 B2 7/2003 Nakajima et al.
6,606,494 B1 8/2003 Arpee et al.
6,618,650 B1 9/2003 Nakai et al.
6,708,036 B2 3/2004 Proctor et al.
6,711,404 B1 3/2004 Arpee et al.
6,718,425 B1 4/2004 Pajakowski et al.
6,792,263 B1 9/2004 Kite
6,799,046 B1 9/2004 Tang
6,842,620 B2 1/2005 Smith et al.
6,882,930 B2 4/2005 Trayford et al.
6,911,918 B2 6/2005 Chen
6,922,629 B2 7/2005 Yoshikawa et al.
6,931,309 B2 8/2005 Phelan et al.
6,947,833 B2 9/2005 Kita et al.
6,952,643 B2 10/2005 Matsuoka et al.
6,989,765 B2 1/2006 Gueziec
7,027,819 B2 4/2006 Ozturk et al.
7,031,983 B2 4/2006 Israni et al.
7,062,379 B2 6/2006 Videtich
7,085,649 B2 8/2006 Baur et al.
7,107,038 B2 9/2006 Fitch et al.
7,155,376 B2 12/2006 Yang et al.
7,174,253 B2 2/2007 Videtich
7,243,134 B2 7/2007 Bruner et al.
7,246,007 B2 7/2007 Ferman
7,343,242 B2 3/2008 Breitenberger et al.
7,383,438 B2 6/2008 Fahrny et al.
7,444,237 B2 10/2008 Dale
7,487,074 B2 2/2009 Ohtsu et al.
7,519,564 B2 4/2009 Horvitz
7,525,451 B2 4/2009 Yoshikawa et al.
7,590,483 B2 9/2009 Tsuge et al.
7,617,042 B2 11/2009 Horvitz et al.
7,620,402 B2 11/2009 Feldman et al.
7,650,227 B2 1/2010 Kirk et al.
7,653,480 B2 1/2010 Tsuge et al.
7,689,348 B2 3/2010 Boss et al.
7,698,055 B2 4/2010 Horvitz et al.
7,706,965 B2 4/2010 Downs et al.
7,729,932 B2 6/2010 Yokota et al.
7,739,040 B2 6/2010 Horvitz
7,760,913 B2 7/2010 Rahmes et al.
7,764,810 B2 7/2010 Rahmes et al.
7,783,415 B2 8/2010 Yamane et al.
7,805,142 B2 * 9/2010 Calin .................... H04W 36/22 370/331
7,809,500 B2 10/2010 Couckuyt et al.
7,818,412 B2 10/2010 Krause et al.
7,826,857 B2 11/2010 Kiviranta et al.
7,831,380 B2 11/2010 Chapman et al.
7,840,339 B2 11/2010 Kim et al.
7,899,611 B2 3/2011 Downs et al.
7,899,612 B2 3/2011 Kumagai et al.
7,908,075 B2 3/2011 Qi et al.
7,908,076 B2 3/2011 Downs et al.
7,912,574 B2 3/2011 Wurman et al.
7,949,463 B2 5/2011 Ignatin
7,953,544 B2 5/2011 Amemiya et al.
7,966,107 B2 6/2011 Schneider et al.
8,090,523 B2 1/2012 Takeuchi et al.
8,150,611 B2 4/2012 Mukherjee
8,160,805 B2 4/2012 Downs et al.
2001/0018628 A1 8/2001 Jenkins et al.
2001/0029425 A1 * 10/2001 Myr ................... G01C 21/3492 701/117
2001/0034577 A1 10/2001 Grounds et al.
2001/0037174 A1 11/2001 Dickerson
2002/0009184 A1 1/2002 Shnier
2002/0026278 A1 2/2002 Feldman et al.
2002/0030698 A1 3/2002 Baur et al.
2002/0049630 A1 4/2002 Furuta et al.
2002/0055818 A1 5/2002 Gaspard, II
2002/0120390 A1 8/2002 Bullock
2002/0198694 A1 12/2002 Yang et al.
2003/0003918 A1 1/2003 Proctor et al.
2003/0040944 A1 2/2003 Hileman
2003/0069683 A1 4/2003 Lapidot et al.
2003/0096620 A1 5/2003 Ozturk et al.
2003/0135304 A1 7/2003 Sroub et al.
2003/0219024 A1 11/2003 Purnadi et al.
2003/0225668 A1 * 12/2003 Goto .................... G06Q 10/047 705/37
2003/0236818 A1 12/2003 Bruner et al.
2004/0076279 A1 4/2004 Taschereau
2004/0082312 A1 4/2004 O'Neill et al.
2004/0111214 A1 6/2004 Buecher et al.
2004/0143385 A1 * 7/2004 Smyth .................. G08G 1/0104 701/117
2004/0169589 A1 * 9/2004 Lea ......................... G01S 13/75 340/8.1
2004/0243285 A1 12/2004 Gounder
2004/0243533 A1 * 12/2004 Dempster ......... G06F 17/30241
2005/0026619 A1 2/2005 Jha
2005/0065682 A1 3/2005 Kapadia et al.
2005/0065711 A1 * 3/2005 Dahlgren ............... G01C 21/26 701/117
2005/0187675 A1 * 8/2005 Schofield .................. B60R 1/12 701/2
2005/0192031 A1 9/2005 Vare
2006/0009885 A1 1/2006 Raines et al.
2006/0025158 A1 2/2006 Leblanc et al.
2006/0089787 A1 * 4/2006 Burr ................... G01C 21/3469 701/533
2006/0211446 A1 * 9/2006 Wittmann .............. G01C 21/26 455/552.1
2006/0223529 A1 * 10/2006 Yokota ................. G08G 1/0104 455/433
2007/0060108 A1 3/2007 East et al.
2007/0106465 A1 5/2007 Adam et al.
2007/0121911 A1 * 5/2007 Baudino ......... H04M 1/274516 379/355.04
2007/0208498 A1 * 9/2007 Barker ................. G08G 1/0104 701/117
2008/0071465 A1 * 3/2008 Chapman ........... G01C 21/3691 701/117
2008/0104631 A1 * 5/2008 Krock .................. G08B 27/005 725/32
2008/0208451 A1 8/2008 Minami
2008/0214192 A1 9/2008 Soliman
2008/0255754 A1 * 10/2008 Pinto .................. G01C 21/3691 701/119
2009/0036148 A1 2/2009 Yach
2009/0079586 A1 * 3/2009 Bespalov ............. G08G 1/0104 340/905
2009/0177373 A1 * 7/2009 Groenhuijzen ........ G01C 21/36 701/117
2009/0248283 A1 * 10/2009 Bicego, Jr. ......... G01C 21/3691 701/117
2009/0287403 A1 11/2009 Fastenrath et al.
2009/0325612 A1 * 12/2009 Oesterling .............. H04W 4/14 455/466
2010/0010739 A1 1/2010 Tsushima
2010/0217519 A1 8/2010 Englerth et al.
2010/0285772 A1 11/2010 Colonna et al.
2011/0063439 A1 3/2011 Klein et al.
2011/0068952 A1 * 3/2011 Srinivasan ............ G06Q 10/08 340/928
2011/0087429 A1 4/2011 Trum
2011/0118972 A1 5/2011 Boschker
2012/0010906 A1 * 1/2012 Foladare ................ G06Q 40/08 705/4

(56) References Cited

U.S. PATENT DOCUMENTS

2012/0108163 A1* 5/2012 Bai .................... H04L 12/1854 455/3.06
2012/0158820 A1* 6/2012 Bai ........................ G07C 5/008 709/202

FOREIGN PATENT DOCUMENTS

| | | | |
|---|---|---|---|
| CN | 1841439 | A | 10/2006 |
| CN | 101295436 | A | 10/2008 |
| DE | 3346548 | A1 | 7/1985 |
| DE | 4005803 | A1 | 8/1990 |
| DE | 4241408 | A1 | 6/1994 |
| DE | 19638798 | A1 | 3/1998 |
| DE | 19651146 | A1 | 6/1998 |
| DE | 19755875 | A1 | 6/1998 |
| DE | 19917154 | A1 | 10/2000 |
| DE | 19933639 | A1 | 1/2001 |
| DE | 19948416 | A1 | 4/2001 |
| DE | 10063588 | A1 | 7/2001 |
| DE | 10037827 | A1 | 2/2002 |
| DE | 102006033744 | A1 | 1/2008 |
| DE | 102005009604 | B4 | 7/2008 |
| EP | 0365097 | A1 | 4/1990 |
| EP | 0372840 | A2 | 6/1990 |
| EP | 0715285 | A1 | 6/1996 |
| EP | 0715286 | A1 | 6/1996 |
| EP | 0715288 | A1 | 6/1996 |
| EP | 0715291 | A1 | 6/1996 |
| EP | 0763807 | A1 | 3/1997 |
| EP | 0834840 | A1 | 4/1998 |
| EP | 0838663 | A2 | 4/1998 |
| EP | 0838797 | A1 | 4/1998 |
| EP | 0879459 | A1 | 11/1998 |
| EP | 0879460 | A1 | 11/1998 |
| EP | 0921509 | A2 | 6/1999 |
| EP | 0936590 | A1 | 8/1999 |
| EP | 0951187 | A1 | 10/1999 |
| EP | 1162560 | A2 | 12/2001 |
| EP | 1320075 | A2 | 6/2003 |
| EP | 1387333 | A1 | 2/2004 |
| EP | 1515122 | A1 | 3/2005 |
| EP | 1550842 | A1 | 7/2005 |
| EP | 1576561 | A2 | 9/2005 |
| EP | 1591980 | A1 | 11/2005 |
| EP | 1600735 | A1 | 11/2005 |
| EP | 1640691 | A2 | 3/2006 |
| EP | 1742190 | A2 | 1/2007 |
| EP | 1900588 | A1 | 3/2008 |
| EP | 1959414 | A1 | 8/2008 |
| EP | 2012289 | A1 | 1/2009 |
| EP | 2142887 | A1 | 1/2010 |
| FR | 2922347 | A1 | 4/2009 |
| GB | 2431261 | A | 4/2007 |
| JP | H01137778 | A | 5/1989 |
| JP | H04290098 | A | 10/1992 |
| JP | H0546086 | A | 2/1993 |
| JP | H05233996 | A | 9/1993 |
| JP | H0612593 | A | 1/1994 |
| JP | H0783685 | A | 3/1995 |
| JP | H08129567 | A | 5/1996 |
| JP | H0914986 | A | 1/1997 |
| JP | H09113290 | A | 5/1997 |
| JP | 2653282 | B2 | 9/1997 |
| JP | H10300495 | A | 11/1998 |
| JP | H01125389 | A | 1/1999 |
| JP | 2927277 | B2 | 7/1999 |
| JP | H11328571 | A | 11/1999 |
| JP | 3052405 | B2 | 6/2000 |
| JP | 3171031 | B2 | 5/2001 |
| JP | 2001124569 | A | 5/2001 |
| JP | 2002122437 | A | 4/2002 |
| JP | 2002206395 | A | 7/2002 |
| JP | 3353656 | B2 | 12/2002 |
| JP | 3367514 | B2 | 1/2003 |
| JP | 3566503 | B2 | 9/2004 |
| JP | 3593749 | B2 | 11/2004 |
| JP | 4572944 | B2 | 11/2010 |
| WO | 9411839 | A1 | 5/1994 |
| WO | 9502307 | A1 | 1/1995 |
| WO | 9514292 | A1 | 5/1995 |
| WO | 9610807 | A1 | 4/1996 |
| WO | 9625830 | A1 | 8/1996 |
| WO | 9629688 | A1 | 9/1996 |
| WO | 9642179 | A1 | 12/1996 |
| WO | 9729470 | A1 | 8/1997 |
| WO | 9729471 | A1 | 8/1997 |
| WO | 9731241 | A1 | 8/1997 |
| WO | 9736148 | A1 | 10/1997 |
| WO | 9737318 | A1 | 10/1997 |
| WO | 9740606 | A2 | 10/1997 |
| WO | 9815149 | A1 | 4/1998 |
| WO | 9815935 | A1 | 4/1998 |
| WO | 9823115 | A1 | 5/1998 |
| WO | 9826395 | A1 | 6/1998 |
| WO | 9829758 | A1 | 7/1998 |
| WO | 9836397 | A1 | 8/1998 |
| WO | 9842179 | A1 | 10/1998 |
| WO | 9854682 | A1 | 12/1998 |
| WO | 9963499 | A2 | 12/1999 |
| WO | 0101367 | A1 | 1/2001 |
| WO | 0123835 | A2 | 4/2001 |
| WO | 0135370 | A1 | 5/2001 |
| WO | 0148725 | A1 | 7/2001 |
| WO | 0201158 | A1 | 1/2002 |
| WO | 0201532 | A1 | 1/2002 |
| WO | 0203350 | A1 | 1/2002 |
| WO | 0243026 | A1 | 5/2002 |
| WO | 03041030 | A2 | 5/2003 |
| WO | 03073048 | A2 | 9/2003 |
| WO | 2004021305 | A2 | 3/2004 |
| WO | 2004086799 | A1 | 10/2004 |
| WO | 2005098780 | A1 | 10/2005 |
| WO | 2006000208 | A1 | 1/2006 |
| WO | 2006005906 | A1 | 1/2006 |
| WO | 2006025728 | A1 | 3/2006 |
| WO | 2006073997 | A1 | 7/2006 |
| WO | 2007103180 | A2 | 9/2007 |
| WO | 2007149703 | A2 | 12/2007 |
| WO | 2008114369 | A1 | 9/2008 |
| WO | 2008136576 | A1 | 11/2008 |
| WO | 2009015482 | A1 | 2/2009 |
| WO | 2009083028 | A1 | 7/2009 |
| WO | 2009113386 | A1 | 9/2009 |
| WO | 2009130257 | A2 | 10/2009 |
| WO | 2009156426 | A1 | 12/2009 |
| WO | 2010000707 | A1 | 1/2010 |
| WO | 2010074668 | A1 | 7/2010 |
| WO | 2010081540 | A1 | 7/2010 |
| WO | 2010086620 | A1 | 8/2010 |
| WO | 2010119182 | A1 | 10/2010 |
| WO | 2011016819 | A1 | 2/2011 |
| WO | 2011023284 | A1 | 3/2011 |
| WO | 2011051125 | A1 | 5/2011 |
| WO | 2011113525 | A1 | 9/2011 |
| WO | 2011120193 | A1 | 10/2011 |

OTHER PUBLICATIONS

Office Action issued in U.S. Appl. No. 11/269,908 dated Jul. 12, 2010.

Office Action issued in U.S. Appl. No. 11/280,833 dated Feb. 16, 2011.

Office Action issued in U.S. Appl. No. 11/269,908 dated Dec. 27, 2010.

Office Action issued in U.S. Appl. No. 11/269,908 dated Jun. 9, 2011.

Office Action issued in U.S. Appl. No. 10/999,994 dated Dec. 7, 2011.

Office Action issued in U.S. Appl. No. 10/999,994 dated Mar. 21, 2011.

Westerman, M. et al., Integration of Probe Vehicle and Induction Loop Data-Estimation of Travel Times and Automatic Incident Detection, California PATH Research Report, Insitute of Transportation Studies, Jan. 1996.

(56) References Cited

OTHER PUBLICATIONS

Sanker, R. et al. Intelligent Traffic Monitoring System using Wireless Cellular Communications. Proceedings. IEEE Engineering new New Century, Apr. 1997, pp. 210-214.

Abe, K. et al. A planning method combining rule bases and optimization algorithm for transportation networks. Proceedings of the 1992 International Conference on Power Electronics and Motion Control, Nov. 1992, pp. 902-906 vol. 2.

Kuhne, R.D. Data Fusion for dynamic route guidance systems. International Federation of Automatic Control Conference on Transportation Systems, Jun. 1997, p. 1319-23.

Shamanesh, N., "Getting Drivers Out of a Jam," Automotive Engineer, Oct. 1999.

Caffrey, J.J. et al. Overview of Radiolocation in CDMA Cellular Systems, IEEE Communications Magazine (vol. 36, Issue: 4), Chapter "Accuracy Requirement," pp. 7-8.

Wang, S-I. et al., "An Unified Vehicle Supervising and Traffic Information System," Seventh IEEE International Symposium on Personal, Indoor and Mobile Radio Communications, Oct. 1996, pp. 968-972, vol. 3.

Grubbs Test for Outliers, Engineering Statistics Handbook, 2000.

Fastenrath, U. Floating car data on a larger scale. 4th World congress on intelligent transport systems. Oct. 1997.

International Search Report issued in International Patent Application No. PCT/GB2005/002637 dated Sep. 21, 2005.

Written Opinion issued in International Patent Application No. PCT/GB2005/002637 dated Sep. 21, 2005.

Caceres, et al., "Deriving Origin—Destinatoin Data from a Mobile Phone Network," IET Intell. Transp. Syst., 2007, 1 (1), pp. 15-26.

Office Action from related European Application No. 12754045.8—1810 issued May 2, 2016.

* cited by examiner

METHOD AND SYSTEM FOR COLLECTING TRAFFIC DATA

RELATED APPLICATIONS

This application is the U.S. National Stage of International Application No. PCT/GB2012/051517, filed on Jun. 29, 2012, published in English, which claims priority to GB1111093.9, filed Jun. 29, 2011, the entire teachings of the above applications are incorporated herein by reference.

TECHNICAL FIELD

The present invention relates to the collection of traffic data with the aid of mobile communication devices, and in particular to the collection of traffic data identifying congestion.

BACKGROUND

Traffic and travel information is significant in calculating journey times, and avoiding congestion that delays individual route completion. There are a number of ways of obtaining traffic information and calculating travel time.

In the simplest form travel time is calculated mathematically by dividing the distance to be traveled (either estimated or taken from a map) by the average travel speed (either estimated or taken from an analysis of tachograph data in the case of heavy goods vehicles). Journey time and estimated time of arrival are not particularly accurate, and there is no real consideration of potential traffic congestion of either a long-term nature (for example, road works) or a short-term nature (for example, traffic accidents).

Commercial operations require a greater degree of accuracy to forecast travel times, particularly when using vehicle routing and scheduling techniques to plan vehicle journeys. As a result, traffic planners may use estimated speeds for different types of vehicles over different types of roads (for example, motorways, urban dual carriageways or road surge carriageway arterial roads). Computer based maps with algorithms which determine the shortest path between two points subsequently divides the route into road lengths by type of road and applies estimated speeds to obtain a journey time. Further developments of this technique have, where traffic congestion is known to occur, applied congestion parameters in the form of percentage achievement of the estimated journey time between specific times of the day for particular types of road (for example, urban motorways between 07.30 am and 10.00 am should be 60% of the estimated journey time). However, commercial operators who undertake comparisons of "planned" and "actual" journey times from the tachograph analysis still show significant differences, which are retrospectively found to be caused by traffic congestion.

Traffic congestion at the same location and same time, which is repeated either on consecutive days of the week or the same day of the week, is by its nature forecastable and can be accounted for in traffic planning. However, forecasting based on such repeated congestion does not take account of unpredictable congestion, and thus does not accurately relate the speed of a vehicle to an actual road length at a specific time of day.

Real time traffic information is also required by both drivers and commercial vehicle operators in order to avoid delays caused by unforecastable events such as traffic accidents. There are a number of different ways in which real time traffic information is obtained. The most reliable real time traffic information system is the "incident spotter," which may be a designated traffic incident reporter (for example, an Automobile Association traffic reporter on a motorbike) reporting traffic congestion to a central control, or a member of the general public (a driver located in traffic congestion) reporting incidents to a radio station by mobile telephone. Local radio stations may consolidate local traffic data from incident spotters, taxi firms, bus companies and the general public to enable them to broadcast real-time traffic information. Such information is normally vetted by means of many reports on the same incident then disseminated to the public by such means as traffic reports on the radio or by means of traffic information reports by cellular telephones. Such a system only reports incidents as they occur and the information is limited to the immediate vicinity of the incident. In addition the radio reports often continue to be broadcast long after the incident is cleared and traffic is proceeding normally because there is often no real verification process after the initial reports. Users may, based upon the information given, make their own informed choice to divert to an alternative route even when it may not be necessary to do so.

More accurate real-time systems use detectors, which are either sensors on road and bridges or cameras alongside the road that are linked to a local traffic reporting (or control) facility, thereby allowing the dissemination of real-time traffic information. Such detectors are normally located at potential traffic congestion points in order that early warning may be issued by the traffic control authority. Such information is often validated by the police or "incident spotters" and passed on to radio stations or organizations providing traffic information by means of cellular telephones. These systems tend to be geographically limited and again, information on an incident may be communicated well after it is cleared and traffic proceeding normally-unless there is a verification procedure which up-dates the situation on a regular basis.

Vehicles fitted with radio data systems with traffic messaging channels (RDS-TMC systems) may also obtain local messaging and be able to process alternative routes through the vehicle navigation system, but this generally only occurs when the original route is either "closed" or "severely delayed".

A further traffic information system currently available is a network based vehicle tracking and tracing system, which tracks off call handovers of cellulur mobile devices carried in vehicles. As is well known, cellular communication networks track the location of mobile communication devices even when they are not making a call, and keep an up to date record of which location area each mobile device is located in. Generally, each location area is a group of cellular network cells. These records are available from cellular communication network operators and can be used to track the handovers of mobile devices between different location areas. It is well understood how these off call handovers can be used to determine the positions of vehicles at different times and so measure the speed of vehicles passing through location areas. The location areas are relatively large so that the resulting traffic information is of limited use because it is has poor resolution.

A further traffic information system currently available is the individual vehicle tracking and tracing system, which uses a vehicle probe fitted with a global positioning system (GPS) to detect the vehicle location. The vehicle's speed is determined based upon a number of location readings over time. In addition, the vehicle probe has a memory device which records time, data, location and speed at specific time intervals. The collection of such information, either in real-time using a cellular mobile telephone system (GSM) or GPRS, or after the event by radio data download, is known as the "floating vehicle data" (FVD™) technique. This data is both specific and customized to particular vehicles (operated by those requiring the traffic data), and timely insofar as the data can be collected either in real-time or historically. The extensive data may be analysed by type of vehicle, location (road, length), time of day and day of the week. In principle systems of this type can provide very accurate and timely information. However, in practice there can be problems that if the number or density of probe vehicles in a region of the road network is low there may not be sufficient information available to reliably determine traffic conditions.

SUMMARY

According to a first aspect of the present invention there is provided a method of identifying congestion comprising the steps of:

- monitoring traffic conditions using off call tracking data relating to cellular mobile communication devices carried in vehicles along an off call path;
- determining when an off call path crossing time of the call path exceeds a threshold;
- when the off call path crossing time exceeds the threshold, obtaining traffic data from probe vehicles on roads corresponding to the off call path;
- analysing the traffic data to determine the location of the congestion along the off call path.

The invention further provides systems, devices, computer-implemented apparatus and articles of manufacture for implementing the aforementioned method; computer program code configured to perform the steps according to the aforementioned method; a computer program product carrying program code configured to perform the steps according to the aforementioned method; and a computer readable medium carrying the computer program.

DETAILED DESCRIPTION

An overview of the basic method of the present invention is as follows.

Traffic conditions are monitored using off call tracking of cellular mobile communication devices carried in vehicles along off call paths. When the monitored traffic conditions indicate that there is congestion on an off call path, traffic data obtained from GPS equipped probe vehicles on roads corresponding to the congested off call path is analysed to determine more precisely the location and severity of the congestion. Once the precise location and severity of the congestion have been determined subsequent changes in the congestion can be monitored using off call tracking.

The present invention blends together traffic information obtained by off call tracking and GPS probe vehicles to provide more detailed information about congestion than can be provided by off call monitoring alone, even in regions of the road network where there are insufficient GPS equipped probe vehicles to reliably provide a direct measure of congestion.

In order to carry out the method off call paths must be defined. As is well known, off call paths are vehicle routes passing through a location area. Generally, location areas are relatively large and may potentially contain a large number of interconnected roads, for example a major city may comprise five or six location areas, which will each contain a very large number of interconnected roads. Accordingly, useful off call paths are generally defined by trunk roads or motorways extending directly, or in a topologically simple manner, across a location area.

Thus, the off call paths which can be usefully defined are determined by the location of the boundaries of each location area and the physical layout of the local road network. In the discussion below the boundaries of the location area are assumed to be fixed. This is not strictly the case, the boundaries can be moved. However, in practice the boundaries are usually fixed for long periods so that they can be treated as fixed for the purposes of gathering traffic information. If the boundaries do move the off call paths must be redefined.

The movement of vehicles along the off call path can then be monitored by comparing the times at which specific cellular mobile communication devices located in vehicles cross the boundaries of a location area at opposite ends of the off call path. The time taken to traverse the off call path can then be determined and the average speed of the vehicle determined, since the locations of and distance between the ends of the off call path are known.

As is explained above, off call traffic monitoring is well known. The skilled person will be well aware of the necessary techniques to define off call routes and monitor traffic moving along the off call routes.

The method then comprises the following general steps.

Step 1

Monitoring off call traffic data regarding a number of off call paths and identifying when the off call traffic data indicates that an off call path is congested.

This step may be carried out by the sub-steps of:

a. Setting a threshold path crossing time for each off call path, when the path crossing time exceeds this threshold the off call path is considered to be congested.

b. Monitoring off call path crossing times and deciding whether the off call path crossing times are over the threshold or not.

c. Optionally, projecting the 'current' state of the off call path, depending on its recent history. Essentially this means making a short term prediction of the state of the off call path based on the available traffic data. This predictive approach may be desired because off call traffic data is a latent measure, that is, off call traffic data can only provide information when a vehicle carrying a cellular device leaves a location area, and the provided information is retrospective information about past traffic conditions during the just completed journey across the location area. When there is congestion traversing the off call paths can take a significant length of time, for example 20-30 minutes. Since the traffic information is retrospective it follows that predictions based on the traffic information are required to determine the current traffic conditions. For example, if we know that the crossing time for an off call path is falling then it may be better to project this fall into the future and use a lower crossing time than that actually measured in order to reduce the likelihood of falsely determining that the off call path is congested.

Methods of carrying out these sub-steps are discussed in more detail below.

Step 2

For the off call paths which are identified as congested, examine the TMC links to which those paths correspond.

In telematic traffic monitoring the road network is represented by interconnected route links, commonly referred to as TMC links, in order to allow locations in the road network and routes through the road network to be defined with reference to the route links.

This requires that it is determined which off call paths correspond to which TMC links. This can be done by comparing the physical road network making up the off call path with the TMC links. This task is complicated by the fact that the off call path may follow or cross multiple roads, and follow multiple links of a road or road. There is no physical reason why the boundaries of the location areas correspond to nodes in the route links.

It should be noted that it once the correspondence between the off call paths and the TMC route links has been established this only needs to be changed if the boundaries of the location areas, or the locations of the roads, changes.

Methods of determining how differently defined representations of the road network correspond are well known.

Step 3

When an off call path has been identified as congested, look for congestion events on the TMC route links to which it corresponds.

This requires that traffic information from GPS probe vehicles is analysed to determine where congestion events are located on the TMC network.

Since the GPS probe data and the route links are far more accurate and higher in resolution than the off call path data, this allows the location and extent of the congestion to be determined with greater accuracy than from the off call path data alone.

Methods of carrying out this step are discussed in more detail below.

Step 4

Define a correspondence between the off call path congestion and the TMC link congestion. Then, in the absence of other information, when the off call path congestion changes use this correspondence to make corresponding changes to the TMC link congestion. For example, when the off call path congestion increases, increase the TMC link congestion. When the off call path congestion decreases, decrease the TMC link congestion.

The TMC link congestion is basis of the congestion information used to actually provide traffic and congestion information regarding routes to consumers.

This step may be carried out by the sub-steps of:

d. Defining the correspondences between congestion on the off cell paths and the TMC links.

e. Determining how much to increase or decrease congestion in the TMC links by in response to increases or decreases in the off cell path congestion.

f. Determining where to place congestion in the TMC links when the congestion is increased or decreased.

Methods of carrying out this step are discussed in more detail below.

As mentioned above, the present invention is intended to provide more detailed information about congestion than can be provided by off call monitoring alone in regions of the road network where there are insufficient GPS equipped probe vehicles to reliably provide a direct measure of congestion.

In an integrated traffic information system combining both off call monitoring and GPS probe vehicles the present invention may be used to fill in the gaps in the detailed coverage provided by GPS probe vehicles in places where GPS probe vehicle coverage is lacking because there are insufficient GPS probe vehicles.

As a general comment, it is expected that the main risk in using this method is the generation of false positives, that is, false indications of congestion where it is not present, or not as severe as indicated. Such false positives will of course be damaging to user confidence in any traffic information provided. Accordingly, it is expected that it will usually be preferred to carry out the method in a conservative, rather then extravagant, manner. That is, it is expected that there should be a bias in favour of setting parameters of the method, such as thresholds in a manner tending to reduce indications that there is congestion.

Step 1: Determining Congestion on Off Call Paths—Detail

A more detailed explanation of an exemplary method of carrying out step 1 is set out below. It is believe that all of the concepts required to carry out the exemplary method are well known, so that these will only be discussed in outline.

Sub-Step a

First, the threshold off call path crossing time for determining path congestion may be set by recording path crossing times for all off peak data over a period of time. Outliers may then be removed from the recorded times by using a median filter. The filtered recorded times without outliers may then be used to calculate the median and median absolute deviation. The congestion threshold may then be set as the median crossing time plus a multiple of the median absolute deviation. The multiple can be set quite high, for example a multiple of 6 may be used.

This sets the congestion threshold for an off call path.

Sub-Step b

When determining whether an off call path is congested, we need to be sure that the path is congested in order to avoid false indications of congestion.

The determination could be done by simply confirming that the most recent measured vehicle crossing time is above the threshold. However, in order to be more certain that there is congestion it is preferred to do this by:

Deriving a recent crossing time from a number of measured vehicle crossing time values;

confirming that the recent crossing time is above the threshold; and confirming that enough measured vehicle crossing time values have gone into the calculation of the recent crossing time.

The recent crossing time may be derived from measured vehicle crossing time values using an aggregator. The initial estimate of the crossing time may be taken from the smoothed output of the aggregator. However, we need to be sure that a sufficient number of values went into this smoothed output value.

Accordingly, a minimum number of values required in a given window is set. This minimum number may for example be set to be 6 and a minimum window size set as 10 minutes. One problem which should be taken into account in this setting is that the slower the traffic is, the bigger the window has to be (this is because we have to wait longer for vehicles to appear when there is congestion).

Accordingly, the window may be made proportionally bigger if the crossing time is longer. For example, if the crossing time is twice the median crossing time then the window could be doubled in size, set to say 20 minutes rather than 10, to find the 6 required values.

If the crossing time is above the threshold and the number of values recorded is equal to or greater than the required number, then the path is determined to be congested.

This approach may improve the accuracy and reliability with which the presence of congestion can be determined.

Step 3: Finding Congestion on TMC Links—Detail

As discussed in step 2 above, the TMC links corresponding to the off call paths which are identified as congested can be identified.

All of the GPS units (as discussed above, usually these are GPS probe vehicles) which have reported from the TMC route links corresponding to the congested off call path in a given time window are identified. This time window may for example be set to 60 minutes. All observations from these units on the path are collected. The reports may be collected from a larger time period than the time window, for example the reports may be collected over a period of twice the time window.

The GPS unit reports are compared to the off call path and if a unit has not reported on a minimum percentage of the off call path the reports form that unit are discarded. This percentage may for example be set to 33%.

The GPS unit reports can then be processed to create data regarding complete crossings of the off call path.

To carry out this processing a grid is created of 250 meter sections representing the off call path against the GPS units, and for each unit the unit's observations are entered into the grid. Where a unit has multiple observations on a section, a weighted average is used to calculate the estimate of the unit's speed on the section.

An example of such a grid is shown below as table 1.

TABLE 1

| Unit | 0-250 | 250-500 | 500-750 | 750-1000 | 1000-1250 | 1250-1500 | 1500-1750 | etc | Age |
|---|---|---|---|---|---|---|---|---|---|
| 1 | | | | | | | | | |
| 2 | | | | | | | | | |
| 3 | | | | | | | | | |
| etc | | | | | | | | | |

In table 1 the grid cells for which the indicated GPS unit has provided at least one observation for the indicated off call path section are shaded.

The next step is to find the estimated off call path completion time for each unit. By taking the last point reached by each unit along the off call path and, using the current estimate of speeds calculate the estimated path completion time for each unit. For units which completed the off call path the "age" of the unit, or in other words the age of the observations from that unit, can be taken as the time when the unit completed the off call path. It will be understood that some units might have left the path halfway down, or are currently on the off call path, and so have not actually completed the off call path. For each of these units a projected path completion time can be calculated. This projected completion time can then be used to estimate an 'age' for the unit. A unit which will complete the path in the future will have a negative age, while those units which have, or would have, already completed the path will have positive ages. This is illustrated below in table 2.

TABLE 2

| Unit | 0-250 | 250-500 | 500-750 | 750-1000 | 1000-1250 | 1250-1500 | 1500-1750 | etc | Age |
|---|---|---|---|---|---|---|---|---|---|
| 1 | | | | → | → | → | → | → | |
| 2 | | | | | | | | | |
| 3 | | | | | | | | → | |
| etc | | | | | | → | → | → | |

The first stage to filling in the gaps is to take smoothed estimate of the unit speed in the missing sections by using the age difference and distance to create weighting.

The smoothed estimate may for example be a Gaussian kernelly smoothed estimate. In this case the radiuses need to be defined, but for example an age radius of 7.5 minutes and a distance radius of 200 meters will give much more weight to reports in the same location even if they are much older.

Once all of the gaps in the grid have been filled with estimated values, then edge detection can be used to calculate where in the grid the congestion is located.

This can for example be carried out by first using edge detection to divide the path for each unit into discreet sections with a single speed. Then, based on the green/yellow boundary for each section it can be determined whether that section represents congestion. Finally, the total delay for all consecutive congestion events can be calculated and any congestion events which are less than a predetermined number of sections can be discarded.

In this way it can be determined for each unit the parts of the path where it has been subject to congestion. This will allow the locations and extent of congestion, and possibly changes in the congestion over time to be determined. These can then be reported or otherwise used in a traffic information system.

For example, the location of each congestion event and the duration of the congestion event (in delay time) may be determined and reported.

If there is insufficient GPS unit information within the time window to allow the congestion location in the TMC route links to be determined, the time window may be increased to include older unit information.

Step 4: Create Correspondence Between Paths and Links—Detail

For the most recent link crossing identified in step 3, record the crossing time from the off call path measurement and the crossing time from the route links derived from the GPS unit information.

Subsequently, if the off call path determination continues to indicate that the off call path remains congested, effectively freeze the output indicating the congestion location determined in step 3 at the point it was last recorded. In practice it can generally be assumed that the location of congestion is not moving, or is moving relatively slowly.

If the off call path crossing time increases, add to the duration of the, or each, congestion event identified along the path by a number of seconds which is proportional to the delay of that congestion event.

For example if the off call path crossing time increases by 60 seconds, and we have identified two congestion events along the path with respective delays of 200 and 400 seconds, then we could add 20 seconds to the first event and 40 seconds to the second event.

Further, by applying the current speed on the link at the back of the queue or congestion, it can be determined how much to increase the length of the queue by.

Similarly, when the off call path crossing time decreases, the congestion events can be proportionally reduced.

The congestion may only be recalculated when new observations for the path from GPS units are available.

It will be understood from the explanation above that the identification of congestion based on off call path data according to the present invention allows relatively old GPS unit data to be used to determine the location and extent off the congestion, which old GPS unit data would normally be discarded as too old to be useful.

In one example, instead of calculating the location of the congestion event using information from GPS units the location may be determined from historical data. Of course, this approach can only be used if the location of congestion events on the off call path is consistent over time.

While various embodiments above refer to the use of GPS, it will be appreciated that this invention can be applied to other traffic data gathering methods.

The apparatus described above may be implemented at least in part in software. Those skilled in the art will appreciate that the apparatus described above may be implemented using general purpose computer equipment or using bespoke equipment.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Here, aspects of the methods and apparatuses described herein can be executed on a mobile station and on a computing device such as a server. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

The invention claimed is:

1. A method of identifying congestion comprising:

monitoring traffic conditions using off call tracking data relating to cellular mobile communication devices carried in vehicles along an off call path;

determining when an off call path crossing time of the call path exceeds a threshold;

when the off call path crossing time exceeds the threshold, obtaining traffic data from probe vehicles on roads corresponding to the off call path;

analyzing the traffic data to determine the location of the congestion along the off call path and to determine various degrees of severity of the congestion and to determine physical extent of the congestion; and providing at least one of the location, the various degrees of severity, and the physical extend of the congestion along the off call path as an output of a traffic information system.

2. The method according to claim 1, wherein the threshold is derived from previous off call path crossing times.

3. The method according to claim 2, wherein the threshold is a median of previous off call path crossing times plus a multiple of a median absolute deviation of the previous off call path crossing times.

4. The method according to claim 1, where in the probe vehicles are GPS probe vehicles.

5. The method according to claim 1, further comprising the step of analyzing the traffic data to determine time delay of the congestion.

6. The method according to claim 1, further comprising the step of sending information regarding the determined congestion to a traffic monitoring system.

7. A method of identifying congestion comprising the steps of:

monitoring traffic conditions using off call tracking data relating to cellular mobile communication devices carried in vehicles along an off call path;

determining when an off call path crossing time of the call path exceeds a threshold;

when the off call path crossing time exceeds the threshold, obtaining traffic data from probe vehicles on roads corresponding to the off call path;

analyzing the traffic data to determine the location of the congestion along the off call path and to determine various degrees of severity of the congestion;

after determining the severity of the congestion, monitoring changes in the off call path crossing time, and altering the determined severity of the congestion in dependence on changes in the off call path crossing time; and providing at least one of the location and the degree of severity of the congestion along the off call path as an output of a traffic information system.

8. The method according to claim 7, wherein the determined severity of the congestion is altered in proportion to the changes in the off call path crossing time.

9. A traffic information system for identifying congestion, the traffic information system comprising:

a memory; and one or more processors configured to carry out the method steps monitoring traffic conditions using off call tracking data relating to cellular mobile communication devices carried in vehicles along an off call path;

determining when an off call path crossing time of the call path exceeds a threshold;

when the off call path crossing time exceeds the threshold, obtaining traffic data from probe vehicles on roads corresponding to the off call path;

analyzing the traffic data to determine the location of the congestion along the off call path and to determine various degrees of severity of the congestion and to determine physical extent of the congestion; and providing at least one of the location, the various degrees of severity, and the physical extend of the congestion along the off call path as an output of a traffic information system.

10. A non-transitory computer readable medium that stores instructions which, when executed, causes a device to carry out the method steps of monitoring traffic conditions using off call tracking data relating to cellular mobile communication devices carried in vehicles along an off call path;

determining when an off call path crossing time of the call path exceeds a threshold;

when the off call path crossing time exceeds the threshold, obtaining traffic data from probe vehicles on roads corresponding to the off call path;

analyzing the traffic data to determine the location of the congestion along the off call path and to determine various degrees of severity of the congestion and to determine physical extent of the congestion; and providing at least one of the location, the various degrees of severity, and the physical extend of the congestion along the off call path as an output of a traffic information system.

11. A traffic information system for identifying congestion, the traffic information system comprising:

a memory; and one or more processors configured to carry out the method steps of monitoring traffic conditions using off call tracking data relating to cellular mobile communication devices carried in vehicles along an off call path;

determining when an off call path crossing time of the call path exceeds a threshold;

when the off call path crossing time exceeds the threshold, obtaining traffic data from probe vehicles on roads corresponding to the off call path;

analyzing the traffic data to determine the location of the congestion along the off call path and to determine various degrees of severity of the congestion;

after determining the severity of the congestion, monitoring changes in the off call path crossing time, and altering the determined severity of the congestion in dependence on changes in the off call path crossing time; and providing at least one of the location and the degree of severity of the congestion along the off call path as an output of a traffic information system.

12. A non-transitory computer readable medium that stores instructions which, when executed, causes a device to carry out the method steps of monitoring traffic conditions using off call tracking data relating to cellular mobile communication devices carried in vehicles along an off call path;

determining when an off call path crossing time of the call path exceeds a threshold;

when the off call path crossing time exceeds the threshold, obtaining traffic data from probe vehicles on roads corresponding to the off call path;

analyzing the traffic data to determine the location of the congestion along the off call path and to determine various degrees of severity of the congestion;

after determining the severity of the congestion, monitoring changes in the off call path crossing time, and altering the determined severity of the congestion in dependence on changes in the off call path crossing time; and providing at least one of the location and the degree of severity of the congestion along the off call path as an output of a traffic information system.

* * * * *